J. B. SINDERSON.
GRASS TRIMMER.
APPLICATION FILED APR. 29, 1910.
986,598.
Patented Mar. 14, 1911.
2 SHEETS—SHEET 1.
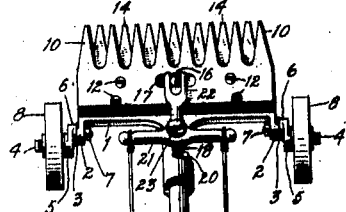
Witnesses:
W. L. Dow
E. Behel
Inventor:
John B. Sinderson
By A. O. Behel
Atty.

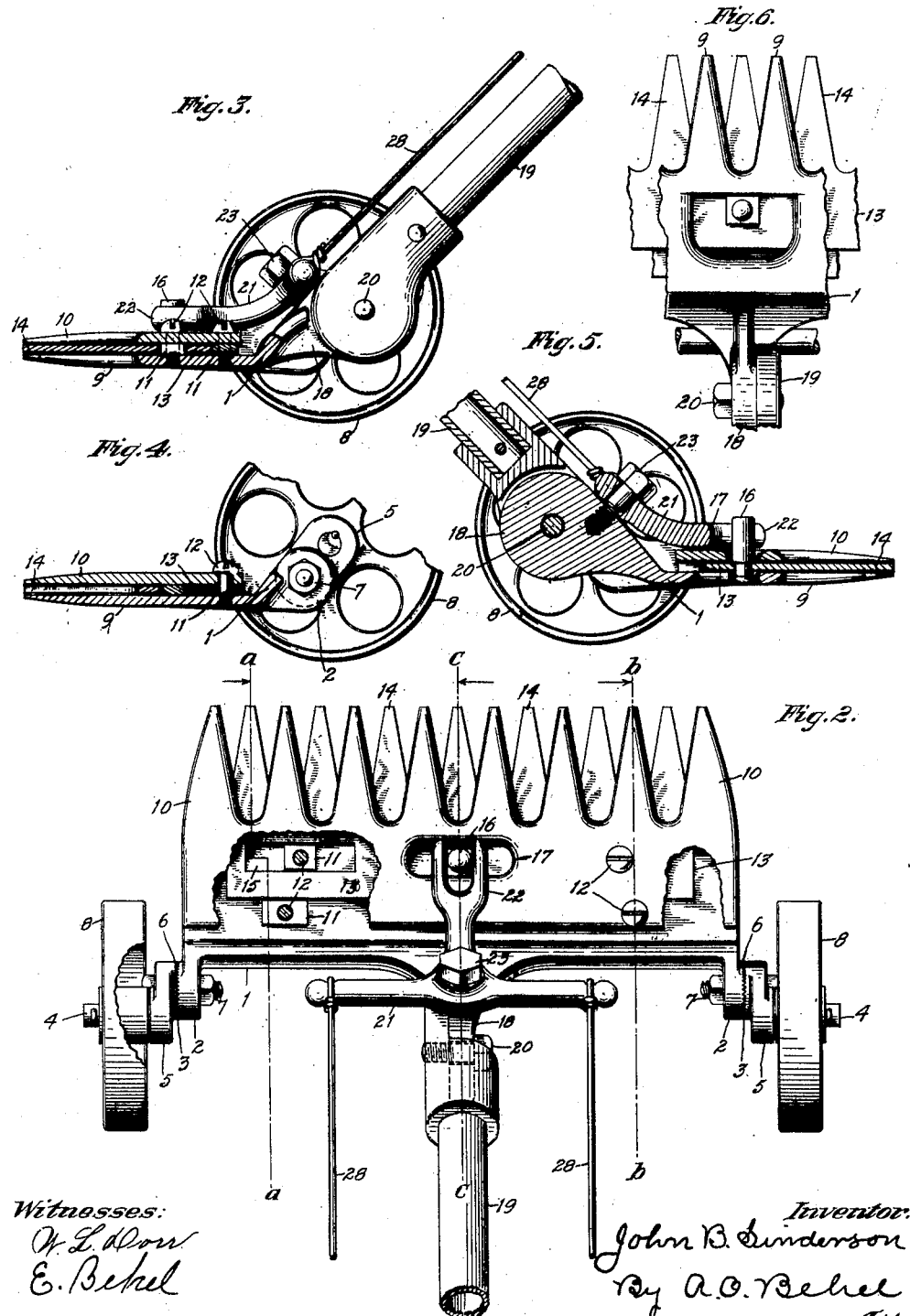

UNITED STATES PATENT OFFICE.

JOHN B. SINDERSON, OF ROCKFORD, ILLINOIS.

GRASS-TRIMMER.

986,598.

Specification of Letters Patent.  Patented Mar. 14, 1911.

Application filed April 29, 1910. Serial No. 558,513.

*To all whom it may concern:*

Be it known that I, JOHN B. SINDERSON, a citizen of the United States, residing at Rockford, in the county of Winnebago and State of Illinois, have invented certain new and useful Improvements in Grass-Trimmers, of which the following is a specification.

The object of this invention is to construct a machine for trimming grass along walks and around trees and shrubbery.

In the accompanying drawings, Figure 1 is a plan view of the complete machine. Fig. 2 is a plan view of the lower portion of the machine, in which portions are broken away. Fig. 3 is a section on dotted line $a\ a$ Fig. 2. Fig. 4 is a section on dotted line $b\ b$ Fig. 2. Fig. 5 is a section on dotted line $c\ c$ Fig. 2. Fig. 6 is an underface view of the center portion of the machine. Fig. 7 is a side elevation of the upper portion of the handle in which portions are broken away. Fig. 8 is a transverse section through the upper end of the handle.

The trimmer is of the type employing a reciprocating cutter.

The frame of the machine comprises a bar 1 having rearwardly extending lugs 2, each formed with a serrated face 3, and each having a horizontally arranged hole. A stub axle 4 is connected to an arm 5 and each arm has a serrated face 6 which engages the serrations 3. Bolts 7 connect the lugs 2 and arms 5. Two supporting wheels 8 receive the stub axles 4 and carry the frame 1 elevated above the ground. By means of the arms 5 in their connection with the lugs 2 the frame 1 can be raised and lowered and held when adjusted to cut the grass different heights.

From the forward edge of the frame 1 extend lower guard sections or fingers 9, and over the fingers are located upper guard sections or fingers 10 which are held spaced from the lower fingers by the blocks 11 through which screws 12 pass into the lower fingers. A knife 13 has cutter sections 14. The knife has lengthwise extending slots 15 which receive two of the blocks 11, and the back edge of the cutter is guided by the remaining two blocks 11 as shown at Fig. 2. A stud 16 is secured to the cutter and extends upwardly through a slot 17 in the section forming the upper fingers 10. The blocks 11 serve to hold the cutter in proper position to be reciprocated. The ends of the cutter sections 14 extend even with the ends of the two series of fingers 9 and 10 so that the knife will cut to its extreme end. This is accomplished by reason of the two series of fingers being open at the ends and not closed as in mowing machines.

From the frame 1 about the center of its length extends a perforated projection 18, to which is pivotally connected a handle 19 by the bolt 20, so that the handle can be raised and lowered to suit the person operating the trimmer. To the projection 18 is pivotally connected a cross-bar 21 having a forwardly extending fork 22. The screw 23 passes through the cross-bar 21 into the projection 18 and forms the pivotal connection between the cross-bar and projection. To the upper portion of the handle is adjustably connected a slidable sleeve 24 by the set screw 25. A hand lever 26 has a pivotal connection with the sleeve by the screw 27. Two wires 28 connect the ends of the cross-bar 21 with the hand lever 26 and by oscillating the hand lever 26 the cross-bar 21 will be oscillated which will cause the cutter to be reciprocated. When the handle 19 is raised on its pivotal connection with the projection 18, slack will be created in the wires 20 which will necessitate the moving of the sleeve toward the upper end of the handle, and when the handle is lowered in its pivotal connection with the projection the wires will become taut which will require the sleeve to be moved toward the lower end of the handle.

To the extreme upper end of the handle 19 is secured a metallic loop 29 which rests on the arm of the operator of the trimmer, and a strap 30 has one end secured to the loop and its upper end has a series of holes 31 which receive a hook 32 extending from the loop. This strap passes around the arm of the operator of the trimmer and has its free end connected to the loop.

The operation of the trimmer is clearly understood from the drawings and description.

I claim as my invention.

1. In a grass trimmer, the combination with a frame, of cutting mechanism mounted thereon, a handle pivoted to the frame, means for securing the handle against pivotal movement on the frame and in different positions with respect to said frame, a sleeve slidable longitudinally on the handle, means for securing the sleeve against relative movement to the handle, actuating means mounted on the sleeve, and connections between the actuating means and the cutting mechanism.

2. In a grass trimmer, the combination with a frame, of a reciprocatory cutter mounted thereon, an oscillatory cross bar pivotally mounted on the frame and having a connection with the cutter, a handle connected to the frame, an oscillatory hand lever fulcrumed between its ends on the handle, and separate connections between the corresponding ends of the lever and the cross bar for effecting the oscillation of the former on the oscillation of the latter.

3. In a grass trimmer, the combination with a frame, of a reciprocatory cutter mounted thereon, an oscillatory cross bar pivotally supported by the frame and having a connection with the cutter, a handle pivoted to the frame, means for securing the handle against its pivotal movement, a hand lever fulcrumed between its ends on the handle, said fulcrum being adjustable along the handle, and spaced wires connecting corresponding ends of the hand lever and cross bar for effecting the oscillation of the latter on the oscillation of the former.

In testimony whereof I have hereunto set my hand in presence of two subscribing witnesses.

JOHN B. SINDERSON.

Witnesses:
A. O. BEHEL,
E. D. E. N. BEHEL.